3,356,457
PREVENTION OF SOLIDS SEPARATION IN $H_2O_2$
George V. Morris, Riverside, and Paul B. Weill, Newport, R.I., assignors to the United States of America as represented by the Secretary of the Navy
No Drawing. Filed May 5, 1965, Ser. No. 453,527
8 Claims. (Cl. 23—207.5)

ABSTRACT OF THE DISCLOSURE

An aqueous hydrogen peroxide solution containing stannate decomposition stabilizers which is further stabilized against solids separation by the addition of a soluble aluminum salt, such as aluminum nitrate. A method for providing the foregoing stabilized solution.

---

The invention described herein may be manufactured and used by or for the Government of the United States of America for governmental purposes without the payment of any royalties thereon or therefor.

This invention relates to the prevention of separation of aluminum-containing solids from concentrated aqueous solutions of hydrogen peroxide, particularly those solutions containing tin compounds. More particularly, the invention relates to the use of water soluble aluminum salts in such solutions, present in a concentration sufficient to prevent the precipitation of insoluble aluminum-containing products which commonly occurs when aluminum metal or aluminum alloys are in contact with stannate-stabilized hydrogen peroxide solutions.

Concentrated hydrogen peroxide has many military and space applications. Its high energy of decomposition and the release of large volumes of gases make is especially useful as a chemical propellant in such devices as rockets or torpedoes and as a steering propellant for space vehicles and the like. In such applications the solution is commonly stored in aluminum containers.

It is well known that hydrogen peroxide has a corrosive effect on alumuinum and aluminum alloys. In the absence of the conventional stabilizers, the aluminum ions are introduced into the hydrogen peroxide solution by corrosion of the aluminum of the container with which it comes into contact. The commonly employed stabilizer, a sodium stannate oil, is effective to reduce the rate of decomposition of hydrogen peroxide but suffers a serious disadvantage in that it is coagulated quite easily by aluminum ions. Whereas hydrogen peroxide solutions devoid of tin additive can tolerate about 50 parts per million of aluminum (p.p.m.), the presence of even minute tin concentrations lowers the tolerance of aluminum to 0.2 p.p.m. The addition of a phosphate stabilizer improves the situation slightly by raising the tolerance level to approximately 1.0 p.p.m. Above the tolerance level, however, the coagulant precipitates out as hard abrasive particles. Thus, not only do the aluminum ions lower the capability of the stannate to stabilize the hydrogen peroxide solution, but also the presence of the abrasive particles is deleterious to the pipes, pumps, valves and other equipment used to handle the hydrogen peroxide solution.

It is an object of this invention to provide a novel combination of stabilizing agents for concentrated hydrogen peroxide.

It is another object of the invention to prevent the separation of hard abrasive particles from solutions of stabilized hydrogen peroxide.

The objects of the invention are accomplished by adding to a stannate-phosphate stabilized hydrogen peroxide solution a water soluble aluminum salt such as the nitrate in a definite concentration range, namely 7 to 50 p.p.m. The invention is not limited to the use of aluminum nitrate, but rather any soluble aluminum salt can be used in the practice of the invention provided the anion is compatible with the hydrogen peroxide solution and with the material of the container. Typical examples of other suitable salts are: aluminum sulfate, aluminum phosphate, aluminum acetate, aluminum ammonium sulfate, aluminum potassium sulfate, and alminum sodium sulfate. The concentration range in which the salt is added is selected to give an aluminum concentration in the range of 7 to 50 parts per million. The invention is operative over the whole hydrogen peroxide concentration range and is especially valuable within the range of 25 to 95 percent hydrogen peroxide.

The apparent pH (as measured directly by a pH meter using glass and calomel electrodes) of a hydrogen peroxide solution at its equivalence point varies with the concentration of hydrogen peroxide from a value of pH=4.5 for 25% hydrogen peroxide to pH=0 for 95% hydrogen peroxide. The maximum stability of a hydrogen peroxide aqueous solution is known to be found at its equivalence point or within a narrow deviation therefrom. The pH of the hydrogen peroxide solution, to which protective aluminum will be added, is therefore adjusted by the careful use of acid or base to any value falling within a range ±1.0 pH units from the equivalence point, provided the aluminum can remain in solution.

The following is suggested as a possible explanation for the effectiveness of aluminum ions in the present invention. The explanation is not to be taken as limiting in any sense.

When aluminum ions enter an aqueous solution of hydrogen peroxide containing colloidal stannic hydroxide, the sol effectively ties up the aluminum ions, probably by adsorption. It is commonly known that the sol micelles cannot tolerate more than 1 p.p.m. of aluminum even in the presence of phosphate ions before coalesence and precipitation occur. In effect, when the aluminum ion concentration is within the range of 1 to 7 p.p.m., the electric charges on the micelles are sufficiently neutralized so that the micelles can no longer remain in colloidal dispersion. Coalesence and precipitation then take place. With a concentration of aluminum in excess of 7 p.p.m., however, there occurs a sign reversal of the charge of the colloid and precipitation is prevented due to the coulombic repulsion of the micelles.

It is clear that there is a maximum tolerance for the aluminum concentration above which it is dependent only on the inherent solubility product of the aluminum species in the medium and is no longer dependent on a colloidal process. It has been found that the protection due to the aluminum additive of this invention is effective up to a concentration of 50 p.p.m. This mechanism suggests that the addition of the protective aluminum solution should be conducted by a procedure designed not only for building rapidly the aluminum concentration into the safe range, but also for preventing any local aluminum concentration above the critical limit for sol precipitation. The procedure therefore calls for adequate aluminum concentration and rapid addition under efficient stirring conditions.

In each of the examples to follow, a stock solution of 90% stabilized hydrogen peroxide was used. This stock solution was prepared, three weeks prior to its use, from commercial grade 98% unstabilized hydrogen peroxide by adding sodium stannate and sodium phosphate thereto in the following concentrations: $Na_2SnO_3 \cdot 3H_2O$, at $2.79 \times 10^{-4}M$ and $Na_2HPO_4 \cdot 7H_2O$ at $2.8 \times 10^{-4}M$. The pH of the solution was adjusted with nitric acid to pH = +0.1.

Two series of experiments were conducted, one over a broad aluminum ion concentration range, the other over two narrow aluminum ion concentration ranges to determine the stabilized hydrogen peroxide tolerance limits for aluminum ion.

EXAMPLE I

In the first set of experiments, twenty-five 10 cc. samples of the stock $H_2O_2$ solution were divided into five groups, each consisting of five samples. The pH of the five groups was adjusted to the following values by the addition of ether $HNO_3$ or NaOH solution: −1.0, −0.5, +0.5, and +1.0. The concentrations of the $HNO_3$ and NaOH were selected so that pH adjustment yielded no appreciable change in the $H_2O_2$ concentration. Aluminum ions were introduced into the five samples of each group by adding to the solutions an aqueous solution of aluminum nitrate of appropriate concentration to result in no appreciable change in the hydrogen peroxide concentration. The aluminum ion concentration of the five samples in each group was 1.5, 3.0, 6.3, 12.5 and 25.0 p.p.m. The additions were made rapidly, with efficient stirring, in order to prevent local concentration formation. The solutions were stored at 25° C. In each group, precipitation occurred in the concentration range 1.5 to 6.3 p.p.m., generally within 24 hours. No precipitate formation occurred in those solutions containing 12 p.p.m. aluminum ion or greater, over a period of nine months. The following table illustrates the results.

TABLE I

| Concentration $Al^{+3}$ (p.p.m.) | pH | | | | |
|---|---|---|---|---|---|
| | −1.0 | −0.5 | 0.0 | +0.5 | +1.0 |
| | Result * | | | | |
| 1.5 | + | + | + | + | + |
| 3.0 | + | + | + | + | + |
| 6.3 | + | + | + | + | + |
| 12.5 | − | − | − | − | − |
| 25.0 | − | − | − | − | − |

*(−) Negative result: no precipitate formation occurred in nine months; (+) positive result: precipitate formation occurred, generally within 24 hours.

From the table, it is apparent that the results are pH independent in the region −1.0 to +1.0.

EXAMPLE II

Twenty-five 10 cc. samples of the stock $H_2O_2$ solution were divided into five groups each consisting of five samples as in the preceding example. The pH of the five groups was adjusted to the same values given in Example I by the method there outlined. Aluminum ions were introduced into the five samples of each group by the method outlined in the first example to yield solutions of the following aluminum ion concentration: 0.1, 0.4, 0.8, 1.0, and 1.3 parts per million. The solutions were stored at 25° C. In each case, precipitation occurred in those solutions containing approximately 1.0 p.p.m. $Al^{+3}$ or higher.

No precipitate formation occurred in those solutions containing less than approximately 1.0 p.p.m. aluminum ion, even after standing for a period of nine months. The following table illustrates the results:

TABLE II

| Concentration $Al^{+3}$ (p.p.m.) | pH | | | | |
|---|---|---|---|---|---|
| | −1.0 | −0.5 | 0.0 | +0.5 | +1.0 |
| | Result * | | | | |
| 0.1 | − | − | − | − | − |
| 0.4 | − | − | − | − | − |
| 0.8 | − | − | − | − | − |
| 1.0 | + | + | + | + | + |
| 1.3 | + | + | + | + | + |

*(+) Positive: precipitation occurred, generally within 24 hours; (−) negative: precipitate formation did not occur even after nine months.

EXAMPLE III

In order to determine more accurately the aluminum ion concentration limit around 7 p.p.m., twenty-five 10 cc. samples of the stock $H_2O_2$ solution were divided into five groups as in the preceding examples. The pH of the five groups was adjusted as in the preceding examples to the same pH values. In the present example, aluminum ions were introduced into the samples to provide aluminum ion concentrations of 5.0, 6.0, 7.0, 8.0, and 9.0 p.p.m. The solutions were stored again at 25° C. No precipitate formation occurred in those solutions containing approximately 7.0 parts per million aluminum ion or greater over a nine month period. At aluminum ion concentrations less than 7 parts per million, precipitation occurred generally within twenty-four hours. The following table illustrates the results:

TABLE III

| Concentration $Al^{+3}$ (p.p.m.) | pH | | | | |
|---|---|---|---|---|---|
| | −1.0 | −0.5 | 0.0 | +0.5 | +1.0 |
| | Result | | | | |
| 5 | + | + | + | + | + |
| 6 | + | + | + | + | + |
| 7 | − | − | − | − | − |
| 8 | − | − | − | − | − |
| 9 | − | − | − | − | − |

The general conclusions which can be drawn from these results are as follows. First, aluminum ions in a concentration range of 0 to 1.0 p.p.m. will not bring about precipitate formation in hydrogen peroxide solutions which are stabilized as before described. Aluminum ions in the concentration range of 1 to 7 p.p.m. will bring about such precipitate formation. But, aluminum ions in a concentration greater than 7.0 p.p.m. but less than 50 p.p.m. will not bring about precipitate formation in stannate-stabilized hydrogen peroxide solutions.

The chief advantage in the use of aluminum salts is that these salts are compatible with hydrogen peroxide and provide the aluminum ions which prevent the formation of precipitates on prolonged standing. In addition, since hydrogen peroxide is normally stored in aluminum containers, the invention provides a solution to the precipitation problem in which a compound is used which has the same cation as the contaminating ion, thus avoiding the introduction of additional foreign ions.

It is to be understood that within the scope of the appended claims the invention may be practiced otherwise than as herein specifically described.

What is claimed is:
1. An aqueous solution of hydrogen peroxide containing a stannate stabilizer and aluminum ions in the concentration range 7 to 50 parts per million.
2. An aqueous solution of hydrogen peroxide having a pH adjusted to a value within ±1.0 pH units of its equivalence point and containing a stannate type stabilizer and aluminum ions in the concentration range 7 to 50 parts per million.

3. A composition comprising
   a stannate stabilized aqueous hydrogen peroxide solution, and
   a soluble aluminum-containing compound selected from the group consisting of aluminum nitrate, aluminum sulfate, aluminum phosphate, aluminum acetate, aluminum ammonium sulfate, aluminum potassium sulfate, and aluminum sodium sulfate.

4. A composition as recited in claim 3 wherein, upon dissolving, the soluble aluminum containing compound provides aluminum ions in the concentration range 7 to 50 parts per million.

5. A composition comprising
   a concentrated aqueous solution of hydrogen peroxide, sodium stannate and sodium phosphate in stabilizing amounts,
   pH adjusting substances in sufficient amount to bring the pH of the solution to a value within ±1.0 pH units of its equivalence point, and
   a soluble aluminum compound selected from the group consisting of aluminum nitrate, aluminum sulfate, aluminum phosphate, aluminum acetate, aluminum ammonium sulfate, aluminum potassium sulfate, and aluminum sodium sulfate.

6. The method of preserving an aqueous solution of hydrogen peroxide without precipitate formation which comprises:
   stabilizing the solution by means of a stannate type stabilizer,
   adjusting the pH of the solution to a value within ±1.0 pH units of its equivalence point, and
   adding to the solution a soluble aluminum salt in sufficient amount to bring the concentration of aluminum ions into the range 7 to 50 parts per million.

7. The method according to claim 6 wherein the soluble aluminum salt is selected from the group consisting of aluminum nitrate, aluminum sulfate, aluminum phosphate, aluminum acetate, aluminum ammonium sulfate, aluminum potassium sulfate, and aluminum sodium sulfate.

8. The method as recited in claim 7, wherein the adding step is carried out rapidly and with efficient stirring.

References Cited

UNITED STATES PATENTS

| | | | |
|---|---|---|---|
| 2,017,440 | 10/1935 | Hawkinson | 23—207 |
| 2,027,839 | 1/1936 | Reichert | 23—207 |
| 3,053,634 | 9/1962 | Luten et al. | 252—397 |

OSCAR R. VERTIZ, *Primary Examiner.*

H. S. MILLER, *Assistant Examiner.*